Feb. 16, 1926.

E. PELOQUIN

GOGGLES

Filed March 31, 1924

1,573,088

INVENTOR
*Edmond Peloquin*
BY
*Harry H. Styll*
ATTORNEY

Patented Feb. 16, 1926.

1,573,088

UNITED STATES PATENT OFFICE.

EDMOND PELOQUIN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed March 31, 1924. Serial No. 703,082.

*To all whom it may concern:*

Be it known that I, EDMOND PELOQUIN, a citizen of the United States, residing at Southbridge, in the county of Worcester and State of Massachusetts, have invented certain new and useful Improvements in Goggles, of which the following is a specification.

The present invention relates to an improved goggle, and has particular reference to a goggle in which the lenses may be quickly and readily removed when desired.

An important object of this invention is to provide a goggle wherein a lens retaining ring is provided, which ring may be quickly removed from the goggle cup when it is desired to remove the lens.

Another very important object of the invention is to provide a goggle of this nature that may be cheaply manufactured, while at the same time it will be a desirable goggle due to the fact that lenses may be quickly interchanged or renewed, and in addition various sized lenses or number of lenses may be used as adjustment may be made with the retaining ring used.

Another important object of the invention is to provide a goggle that will be strong, durable, very simple and inexpensive in construction and manufacture, and wherein the parts are reduced to a minimum.

Other objects and advantages of the invention will become apparent during the course of the following description.

In the drawings, wherein like numerals are employed to designate like parts throughout the same:

Figure 1:
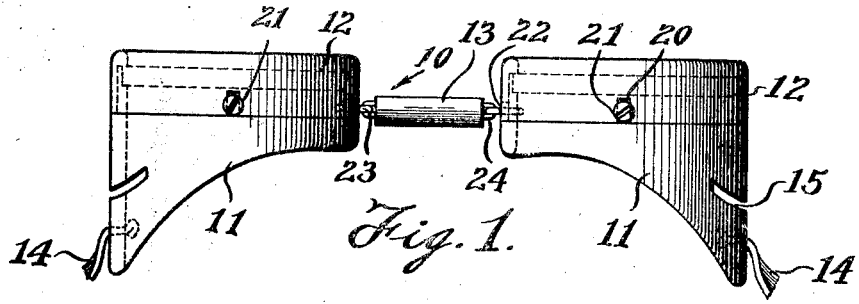
Figure 1 is a top plan view of the completed goggle.

In the drawings, wherein for the purposes of illustration is shown the preferred embodiment of the invention, the numeral 10 designates the goggle in its entirety. The goggle 10 comprises the cups 11, lens retaining rings 12, bridge portion 13, and head straps 14.

Figure 2:
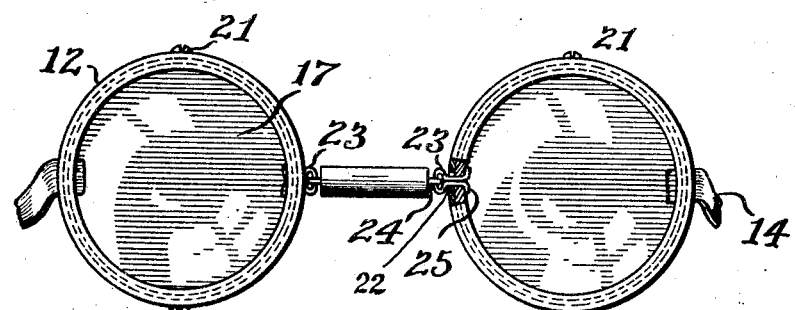
Figure 2 is a front elevation thereof partially in section for the purposes of illustration.
Figures 3, 4:
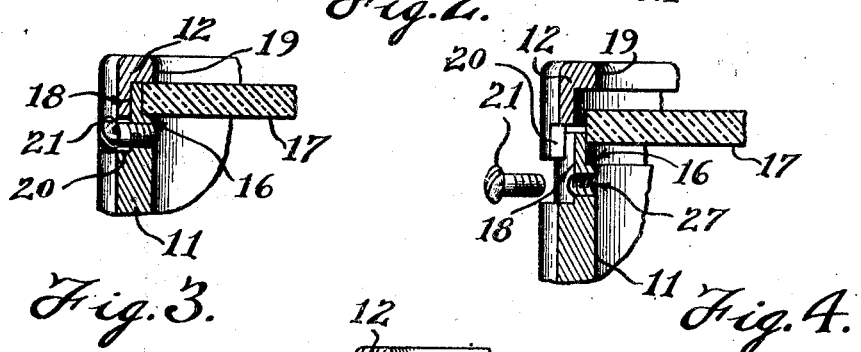
Figure 3 is a fragmentary sectional detail of a portion of the cup.
Figure 4 is the same showing the parts before they are placed in operative position.

The cups 11 may be of the familiar shape so as to conform to the curvature of the user's face, and are provided with suitable ventilating slots, or the like 15. The outer end of the eye cups are, as is clearly shown in Figure 3, provided on the inner surface with the annular groove 16, which is adapted to form a shoulder upon which rests the lens or lenses 17. As is clearly shown, the outer surface of the goggle 11 is also grooved, as at 18. A lens retaining ring 12 which is provided with an annular flange is adapted to slide down into the groove 18 in such a manner that the transverse lens holding flange 19 is adapted to overlie the outer edge of the lens or lenses 17. As is clearly shown in Figures 1 and 2, the lens retaining ring 12 is provided with the cut out places 20 in such a manner that suitable frictional engaging means 21, such as the screws may be passed therethrough and received within suitable openings formed in the cup 11. The frictional engaging means should have a head such as is shown, that will engage the lens retaining cup 12 so that when it is passed through the opening in the cup 11 as far as possible it will engage the ring 12 so as to prevent accidental displacement thereof. A cut out portion 22 is also provided to permit of the passage of the eye 23 therethrough, to which is connected the bridge element 24. The inner ends of the eye 23 may be bent as at 25 to prevent separation of the cups 11 when connected by the bridge element 24 and eyes 23.

Figure 5:
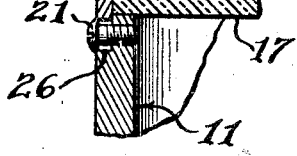
Figure 5 is a fragmentary detail of a slightly modified form.

In Figure 5 a slight modification is shown, wherein the lens 17 is seated directly on the outer end of the cup 11, while the lens retaining ring 12 fits into the recess or groove 26 formed in the said cup. The same sort of fastening means 21 may be used to prevent displacement of the lens retaining ring with respect to the eye cup 11.

In use a pair of cups are selected and the eyes 23 are passed through suitable openings therein and bent over, as at 25, while the bridge element 24 is connected between the two eyes with respective cups. The desired lens or lenses are then placed within the lens receiving groove 16, after which the retaining ring 12 having the flange 19 is slipped over the end of the cup so that the cut out portions 20 will register with the openings 27 formed in the said cup. The fastening means 21 are then passed through the cut out portions 20 and through the threaded apertures 27 and tightened sufficiently to prevent displacement of the ring when in use.

Of course, any suitable number of frictional means, such as 21, may be employed to retain the ring 12 in place and furthermore any form of bridge connection may be used to connect the cups 11. It will readily be seen that various sized lenses may be used with this form of goggle due to the fact that the ring 12 may or may not be shoved down sufficiently far to contact with the shoulder 26 on the groove formed in the cup 11.

It is to be understood that the form of the invention herewith shown and described is to be taken as the preferred embodiment of the same and that various changes in the shape, size and arrangement of parts may be resorted to without departing from the spirit of the invention or the scope of the subjoined claims.

I claim:

1. In a device of the character described, an annular eye cup having a portion adapted to conform to the face, and a reduced portion on the opposite end thereof, a plurality of screw members having projecting heads in the reduced portion, an annular cap adapted to fit over the reduced portion of the eye cup, having a plurality of apertures adapted to slip over the body portion of the screws under the projecting portion so that the projecting portion of the screws will engage the section of the cap surrounding the apertures, whereby the cap may be frictionally held on the reduced portion by tightening up the screws after the cap is slipped in place.

2. In a device of the character described, an annular eye cup having a portion to fit the face and a reduced collar portion at the opposite end, a plurality of screw members having projecting heads in the reduced portion, an eye member in the reduced portion, a cap member adapted to fit over the reduced portion of the eye cup, having a plurality of apertures adapted to slip over the body portions of the screws and the eye member, whereby the cap member may be tightened securely on the reduced portion by tightening up the screws until the projecting heads of the screws engage the portions of the caps surrounding the apertures.

3. In a device of the character described, an eye cup having a portion adapted to fit the face, a reduced collar portion on the opposite end, a plurality of screw members in the reduced portion, having projecting heads, a cap member adapted to fit over the reduced portion, and having a transverse lens holding flange and a plurality of openings adapted to slip over the body portions of the screws under the projecting heads thereof, whereby the cap will be held securely on the eye cup by tightening up the screws, bringing the overhanging heads of the screws into engagement with portions of the cap surrounding the openings, and whereby a lens receiving groove will be formed between the outer end of the eye cup and the transverse lens holding flange of the cap, substantially as shown and described.

EDMOND PELOQUIN.